US 6,602,367 B2

(12) United States Patent
Shimizu et al.

(10) Patent No.: US 6,602,367 B2
(45) Date of Patent: Aug. 5, 2003

(54) METHOD FOR WINDING STRIPS ON THE TIRE BUILDING MACHINE

(75) Inventors: Kentaro Shimizu, Hyogo (JP); Osamu Fujiki, Hyogo (JP); Mitsuru Hitotsuyanagi, Hyogo (JP)

(73) Assignee: Toyo Tire & Rubber Co., Ltd., Osaka (JP)

( * ) Notice: Subject to any disclaimer, the term of this patent is extended or adjusted under 35 U.S.C. 154(b) by 0 days.

(21) Appl. No.: 09/804,567

(22) Filed: Mar. 12, 2001

(65) Prior Publication Data

US 2001/0008162 A1 Jul. 19, 2001

Related U.S. Application Data

(62) Division of application No. 08/943,068, filed on Oct. 2, 1997, now abandoned, which is a continuation of application No. 08/625,989, filed on Apr. 1, 1996, now abandoned, which is a continuation of application No. 08/400,302, filed on Mar. 6, 1995, now abandoned, which is a continuation of application No. 08/187,775, filed on Jan. 26, 1994, now abandoned, which is a continuation of application No. 07/666,099, filed on Mar. 7, 1991, now abandoned.

(30) Foreign Application Priority Data

Mar. 17, 1990 (JP) ................................................ 2-67689
Mar. 17, 1990 (JP) ................................................ 2-67690

(51) Int. Cl.⁷ .............................................. B29D 30/30
(52) U.S. Cl. .......................... 156/64; 156/123; 156/134; 156/405.1
(58) Field of Search ................................. 156/123, 130, 156/133, 134, 405.1, 406.4, 64

(56) References Cited

FOREIGN PATENT DOCUMENTS

JP             1-197609 A     *   8/1989

* cited by examiner

Primary Examiner—Geoffrey L. Knable
(74) Attorney, Agent, or Firm—Jordan and Hamburg LLP

(57) ABSTRACT

A strip member is wound by a tire building machine having a building drum for taking up a strip member of predetermined length without discrete ends and a transfer conveyor for feeding the strip member to the building drum. The winding-start end of the strip member transferred from the transfer conveyor to the building drum and the winding-finish end of the strip member are detected by means of end sensors, measuring the angle through which the building drum has rotated from the output of a winding start signal to the output of a winding finish signal in response to output signals from the sensors by means of an angle detector. A lapping margin between the winding start end and the winding finish end of the strip member is calculated based on the rotational angle and diameter of the building drum by means of an operational means.

2 Claims, 3 Drawing Sheets

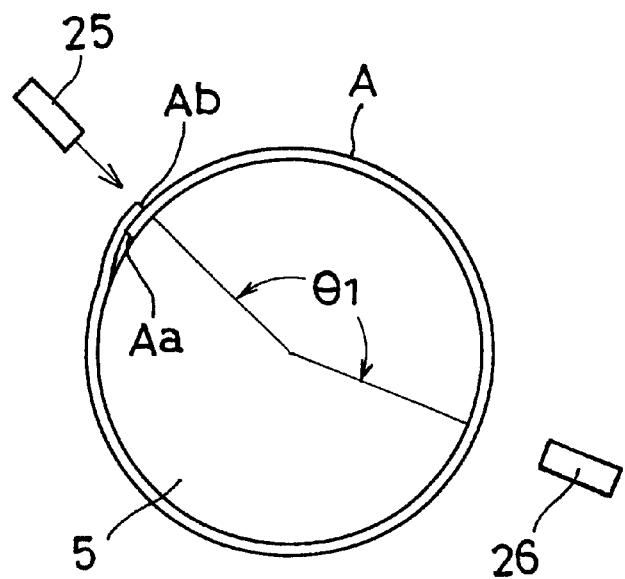
F I G. 3
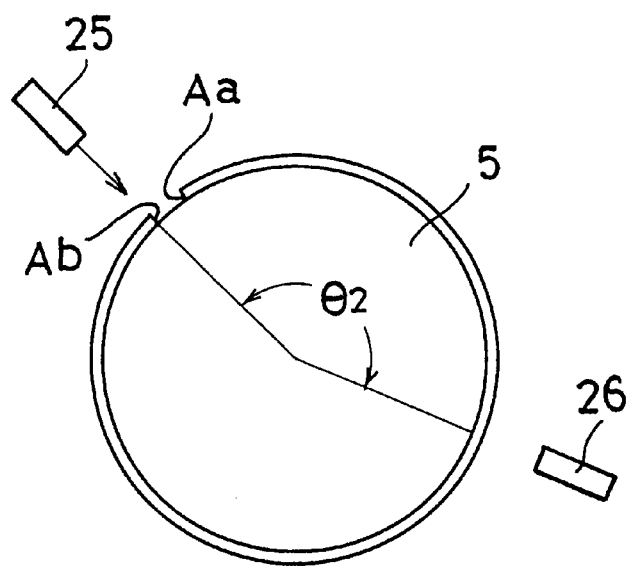
F I G. 4

500# METHOD FOR WINDING STRIPS ON THE TIRE BUILDING MACHINE

This is a division of application Ser. No. 08/943,068 filed Oct. 2, 1997, now abandoned which is a continuation of application Ser. No. 08/625,989, filed Apr. 1, 1996, now abandoned, which, in turn, is a continuation of application Ser. No. 08/400,302, filed Mar. 6, 1995, now abandoned, which, in turn, is a continuation of application Ser. No. 08/187,775, filed Jan. 26, 1994, now abandoned, which, in turn, is a continuation of application Ser. No. 07/666,099, filed Mar. 7, 1991 now abandoned.

BACKGROUND OF THE INVENTION

1. Technical Field

The inventions disclosed in this application relate to methods for winding an automotive tire building strip member on a building drum.

More particularly, the first invention in this application provides a method for winding a strip member such as rubberized steel cord, tread rubber or the like precut to the circumferential length of the building drum of a tire building machine, on said building drum in such a manner that both ends of the strip member will be exactly abutted against each other on the drum.

The second invention in this application relates to an automotive tire building device wherein the lapping margin of ends of a strip member wound on its building drum can be automatically measured.

2. Prior Art

In winding a tire strip member on a building drum, it is at times required to insure exact abutment of its ends and at other times required that the lapping margin (positive and negative) be within certain allowable limits.

As a technology for insuring exact abutment of both ends of a strip member such as rubberized steel cord or tread rubber in the winding thereof on the building drum of an automotive or other tire building machine, there is known the method described in Japanese Patent Publication No. 61-32980. According to this method, the length of the strip precut to the circumferential length of the building drum is measured and, then, a leading portion, of predetermined length, of the strip is taken up on the building drum at the feeding (takeup) speed equal to the peripheral speed of the drum. Then, the feeding speed relative to the building drum speed is altered to either compress or stretch the strip while its intermediate portion is wound on the building drum. Finally, the feeding speed is re-equalized with the peripheral speed of the building drum to wind up the remaining portion of the strip member on the drum.

However, the strip member tends to shrink with the progress of time after cutting and the time to termination of shrinkage and the amount of shrinkage are dependent on the environment and other conditions. Under certain conditions, the amount of post-cutting shrinkage reaches as much as about 0.5%. Moreover, the length of the strip member varies with the magnitude of the tension that acts on the strip when it is transferred from a transfer conveyer to the building drum and the pressure of contact between the strip and the drum. In the prior art method mentioned above, the total length of the strip member is measured while it is undergoing shrinkage after cutting and the ratio of the feeding speed to the peripheral speed of the building drum is set according to the length value thus found so as to compress or stretch the intermediate portion of the strip. As a consequence, the aforesaid ratio is often irrelevant and there occurs an excess or a shortage of compression or stretching of the strip member, thus causing a lapping of the leading and trailing ends of the strip member or a gap therebetween.

Therefore, the first invention in this application provides a winding method which insures exact abutment of said ends or abutment without an appreciable overlap or gap.

Furthermore, in the process of manufacture of an automotive tire, not only the steel cord and tread rubber mentioned above but a variety of other rubber-based strip members are cut to length and both ends thereof are joined to build single-layer or multi-layer ring or cylindrical members. For example, on the primary building machine, an inner liner (a strip member of rubber) and a plurality of ply cords (rubberized fiber cords or steel cords), all precut to the circumferential length of the building drum, are laid up on the peripheral surface of the drum. In the secondary building machine, two steel belts (rubberized steel cords), a cap ply (rubberized nylon cord), etc. are laid up. Some of these different strip members are not joined by abutment at ends as described above but are joined by lapping the trailing end over the leading end on the drum. As mentioned above, the strip member has the property to shrink on standing after cutting to length as mentioned above and the amount of this shrinkage varies with changes in environment. Also as mentioned above, the length of the strip member is altered by external forces that act on the strip when it is transferred from the conveyer to the drum. Therefore, even if the strip member has been cut precisely to length, a variation is inevitable in the degree of lapping of both ends. Therefore, it is common practice for the operator to trim off the rubber or cord at the trailing end when the degree of lapping is too large or unwind the strip partway and rewind it with stretching when there is a gap between ends.

However, the conventional tire building machine is not equipped with very effective means for inspecting the end joint of said strip member and the current trend toward automation of tire building cannot completely avoid a risk of products with said surplus or deficiency in end lapping being shipped uncorrected and marketed.

Accordingly the second invention in this application provides a tire building device which is capable of detecting a surplus or deficiency in end lapping while a strip member is wound on a building drum of said primary or second building machine.

SUMMARY OF THE INVENTION

The method for winding a strip member on a tire building machine in accordance with the first invention in this application comprises feeding a strip member to a building drum by means of a transfer conveyer, taking up said strip member on said building drum while controlling the speeds of said transfer conveyer and building drum and joining free ends of the strip member, which method is characterized by setting the feeding speed of said transfer conveyer and the peripheral speed of said building drum to equal values, taking up a leading portion, of predetermined length, of said strip member on the building drum, detecting the position of a trailing end of said strip member on said transfer conveyer to calculate the length of a trailing portion following said leading portion of said strip member, setting the ratio of the feeding speed of said transfer conveyer to the peripheral speed of said building drum to the ratio L/Lo, where L is the length of said trailing portion and Lo is the residual circumferential length of said building drum, only when the L/Lo ratio is within a set range and taking up the trailing portion of said strip member, while the takeup of the trailing portion of said strip member is stopped when the ratio L/Lo deviates out of said set range.

Thus, after completion of the takeup of a leading portion of the strip member or just before the beginning of takeup of a trailing portion of the strip member, the length of the trailing portion is measured and the trailing portion is wound only when the ratio L/Lo of the length of the trailing portion of the strip member to the residual circumferential length Lo of the building drum is within a set range, with the ratio of the feeding speed to the peripheral speed of the building drum being set to said ratio L/Lo, with the result that the error of length L of the trailing portion of the strip member is minimized to preclude an excessive overlap or gap between ends of the strip member, thus leading to exact abutment of the ends or a minimum of overlap or gap.

The length of the leading portion of said strip member is preferably set to 30~80% of one circumferential length of the building drum. If the set length is less than 30%, installation of a leading end sensor is difficult. Conversely if the set length is over 80%, the stretching or compression of the strip member is concentrated in the trailing portion thereof to adversely affect the quality of the product.

The said ratio L/Lo applicable to the case of continued takeup of the trailing portion of the strip member is preferably set within the range of 0.9995~1.005. Outside of this range, the amount of stretching or compression becomes too great to insure the proper winding.

The method of winding the strip member in accordance with the second invention in this application comprises using a tire building machine having a building drum for taking up a tire-building strip member of predetermined length endlessly and a transfer conveyer for feeding said strip member to said building drum, which method is characterized by detecting the winding-start end of said strip member transferred from said transfer conveyer to said building drum and the winding-finish end of said strip member with end sensors, measuring the angle through which said building drum has rotated from the output of a winding start signal to the output of a winding finish signal in response to output signals from said sensors by means of an angle detector, and calculate a lapping margin between the winding start end and the winding finish end of said strip member based on the rotational angle and diameter of said building drum by means of an operational meals.

In the above method, since the lapping margin between the two ends of the strip member is calculated by said operational means, the building operation can be continued while said lapping margin is within a preset allowable range or the operation can be discontinued or an alarm be actuated when the lapping margin deviates out of said allowable range, that is to say when the lapping margin is too large or too samll. Therefore, in the automatic building process for car tires, the risk of products with lapping defects being shipped can be effectively prevented.

It may be so arranged that one end sensor of the above-described type is used to detect both the winding start and winding finish ends of the strip member or that two such end sensors are installed apart from each other by an optional angle along the circumferential direction of the building drum so that one of the sensors is used to detect the winding start end with the other sensor deteting the winding finish end.

Furthermore, a still more improved accuracy may be insured by installing end sensors in a plurality of positions, for example in the center and in positions on both sides thereof. Moreover, to cope with the case in which one strip member has an intermediate joint of material and this joint builds a step, it may be so arranged that the trailing end sensor is rendered operative only within a certain range, for example in the range of 5 mm, before and after the winding start end, whereby the risk of said joint being mistaken for the winding finish end and detected as such.

In the second invention in this application, the lapping margin of the strip member wound on the building drum includes both a positive value and a negative value. In other words, the case in which the two ends of the strip member actually overlap and the case in which there is a gap between the ends are included. The winding operation is stopped when the actual overlap or gap is too great or too small.

BRIEF DESCRIPTION OF THE DRAWINGS

FIGS. 3 and 4 each is a schematic side view of the building drum, which explains the operation of the example shown in FIG. 2.

PREFERRED EMBODIMENTS OF THE INVENTION

Figure 1:
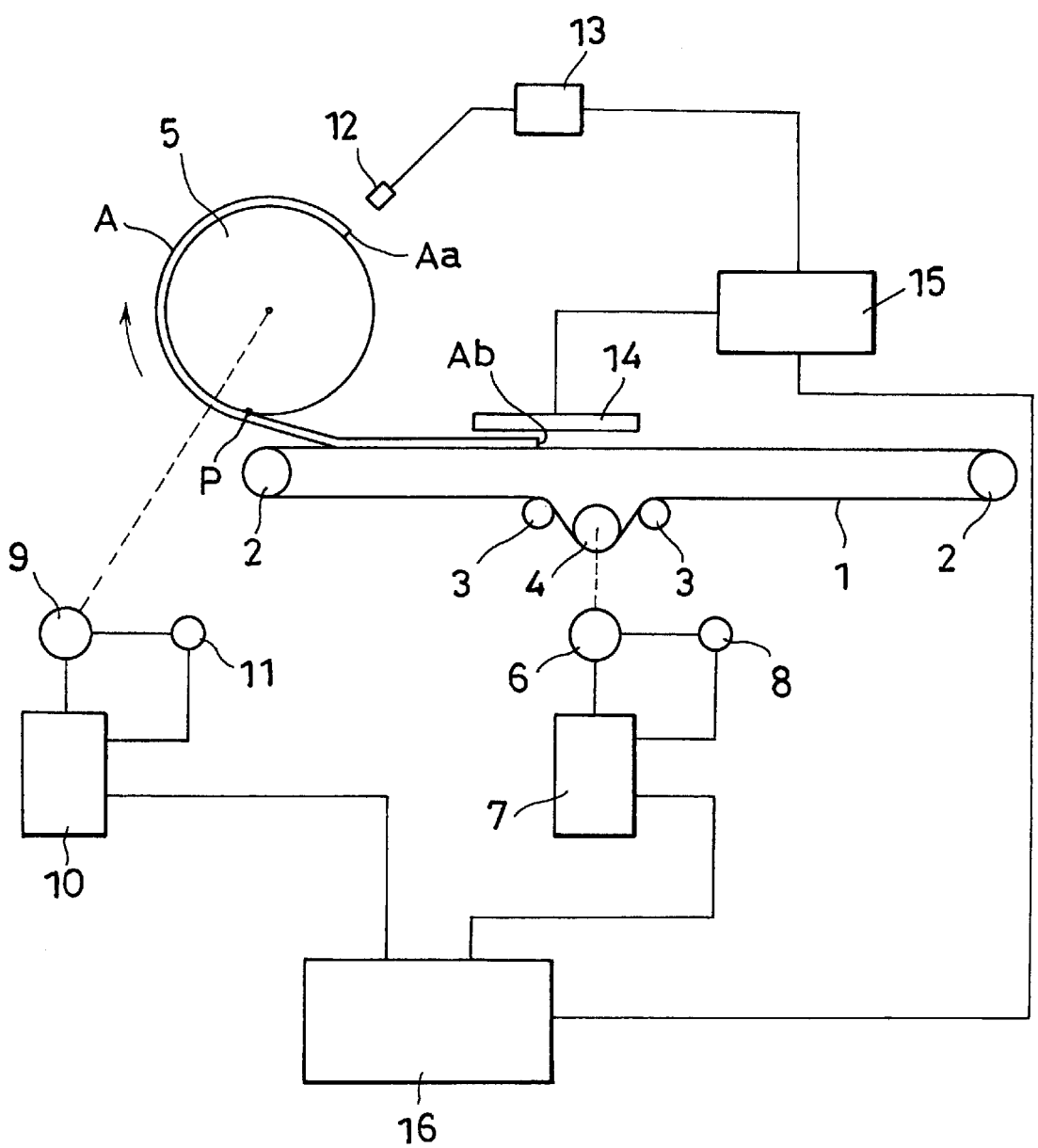
FIG. 1 is a schematic view showing an example of the first invention in this application.

FIG. 1 shows an example of the first invention in this application.

As illustrated, A stands for a tire steel belt, that is to say a strip member, 1 for a transfer conveyer therefor, 2 for an end pulley, 3 for a guide pulley, 4 for a drive pulley, and 5 for a building drum. The drive pulley 3 is connected to a drive shaft of a transfer servo motor 6 and the rotation of this servo motor 6 is controlled by a transfer servo amplifier 7. The rotational speed of said transfer servo motor 6 is detected by a pulse oscillator 8 and fed back to said servo amplifier 7. On the other hand, said building drum 5 is connected to a drive shaft of a drum servo motor 9 and the rotation of this drum servo motor 9 is controlled by a servo amplifier 10. The rotational speed of said drum servo motor 9 is detected by a pulse oscillator 11 and fed back to said servo amplifier 10.

Disposed over said building drum 5 is a leading end sensor 12 for contactless detection of a front end Aa of said strip member A and the output of said leading end sensor 12 is connected to a sensor amplifier 13. On the other hand, a trailing end sensor 14 for detecting the position of the trailing end Ab of strip member A is installed over the transfer conveyer 1. The output terminals of this trailing end sensor 14 and said sensor amplifier 13 are respectively connected to a trailing length meter 15 for calculating the length L of a trailing portion (the length from point P to Ab) of said strip member A. When the leading portion of strip member A is progressively wound on the building drum 5 and the leading end Aa of strip member A is detected by said leading end sensor 12, the trailing end sensor 14 detects the position of the trailing end Ab of strip member A and said trailing length meter 15 calculates the length L of the trailing portion of A which is still to be wound on the building drum 5.

The output terminal of said trailing length meter 15 is connected to a speed ratio calculator 16. This speed ratio calculator 16 calculates the ratio L/Lo of the length L of said trailing portion to the length of strip member A which is still to be wound on the building drum 5, that is the residual circumferential length Lo (length from point P to Aa) and transmits a signal corresponding to this ratio to said transfer servo amplifier 7 and drum servo amplifier 10. Only when said ratio L/Lo is within a set range, the transfer conveyer 1 and building drum 5 are driven at a speed ratio corresponding to the ratio L/Lo. On the other hand, when the ratio L/Lo deviates from said set range, the transfer conveyer 1 and building drum 5 are respectively stopped.

In winding a strip member A having a total length of 2,000 mm on a building drum having a circumferential length of 2,000 mm, the length of the leading portion of strip member A is set to 1,500 mm (75% of the total length) and the speed of the transfer conveyer 1 and the peripheral speed of the building drum 5 are set to the same value. In this condition, the leading portion, which is 1,500 mm long, of said strip member A is taken up on the drum. As the leading end Aa of this strip member A is detected by the leading end sensor 12, the trailing end sensor 15 is caused to detect the position of the trailing end Ab of strip member A and the trailing end length meter 15 to calculate the length L of the trailing portion of the strip member A. Then, the ratio L/Lo of this length L of the trailing portion to the known residual circumferential length Lo of the building drum 5 is calculated and when this ratio L/Lo is within the range of 0.995 to 1.000 (when L-Lo is −2.5 mm~0 mm), the ratio between the peripheral speed of the building drum 5 and the feeding speed of the transfer conveyer 1 is set to said L/Lo so that the strip member A is taken up under tension, i.e., under a stretching force, on the building drum, whereby the leading and trailing ends of the strip member A are exactly abutted against each other without any surplus or deficiency. However, when the ratio L/Lo deviates from the above-mentioned range, the transfer belt 1 and the building drum 5 are respectively stopped and the strip member A is removed.

Figure 2:
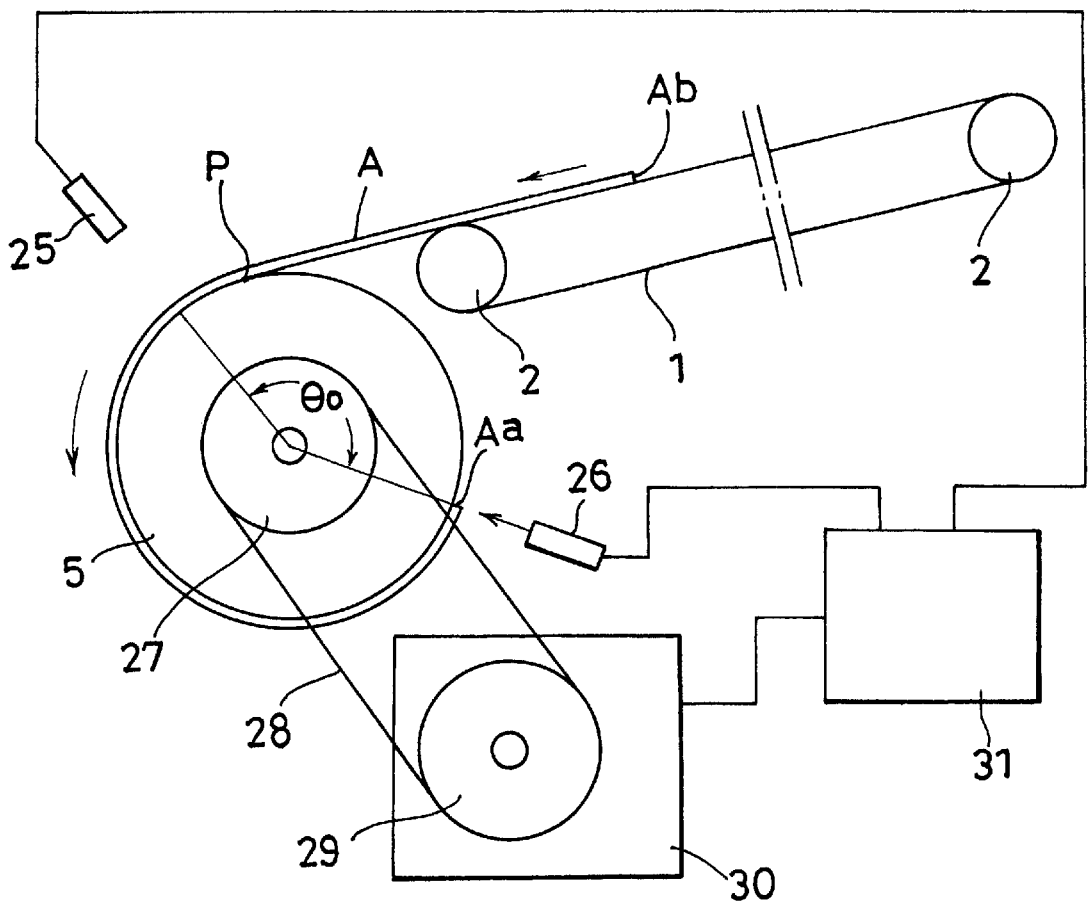
FIG. 2 is a view similar to FIG. 1, showing an example of the second invention in this application.

FIGS. 2 through 4 show an embodiment of the second invention in this application.

Referring to FIG. 2, A stands for a strip member, 1 for a transfer conveyer, 2 for a belt pulley and 5 for a building drum. The building drum 5 and transfer conveyer 1 are driven in the direction of the arrowmark to wind the strip member A on the building drum 5.

Along the path in the direction of advance of said building drum 5 from point P where the strip member A begins to contact the drum 5, there are provided a first end sensor 25 and a second end sensor 26. These end sensors 25 and 26 each comprises a photoelectric element which photoelectrically detects the end of the strip member A. Connected to said building drum 5 is an angle detector 30 through a toothed pulley 27, a toothed belt 28 and a toothed pulley 29. The output terminals of said first end sensor 25, second end sensor 26 and angle detector 30 are respectively connected to an operational unit 31 which calculates a degree of end lapping of said strip member A.

In the above arrangement, as the building drum 5 and transfer conveyer 1 are driven to take up the strip member A on the building drum 5 and the leading end Aa of said strip member A reaches the position of said first end sensor 25, the angle detector 30 is actuated and as the same leading end Aa then reaches the position of said second end sensor 26, the angle of rotation of said building drum 5 from the time of detection of the leading end Aa by the first end sensor 25 to the time of detection of the same end Aa by said second end sensor is measured. Then, based on this measured angle of rotation, the angle $\theta_0$ (degrees) from the second end sensor 26 to the first end sensor 25 is calculated and stored by said operational unit 31 and, at the same time, the indicator of the angle detector 30 is reset to zero. Then, as the first end sensor 25 detects the trailing end Ab of strip member A (FIGS. 3 and 4), the building drum 5 stops rotating and the angles of rotation $\theta_1$ and $\theta_2$ (degrees) are measured.

FIG. 3 shows the situation where the angle of rotation $\theta_1$ (degrees) is larger than the angle $\theta_0$ between the two end sensors 25 and 26 and the end Aa and Ab of the strip member A overlap. The lapping margin X in this situation is defined as follows.

$$(D+2t)\pi \times \frac{\theta_1 - \theta_0}{360} = X$$

where D is the diameter of the building drum 5 and t is the thickness of strip member A.

This value of X is calculated by said operational means 31.

FIG. 4 shows the situation where the angle of rotation $\theta_2$ (degrees) is smaller than the angle $\theta_0$ between the two end sensors 25 and 26 and there is a gap between the ends Aa and Ab of the strip member A. The gap Y in this situation is given by the following equation $$(D+2t)\pi \times \frac{\theta_0 - \theta_2}{360} = Y$$

where D is the diameter of the building drum 5 and t is the thickness of the strip member A.

This value of Y is calculated by said operational means 31.

While the above embodiment employs two end sensors 25 and 26, the second end sensor 26 shown in FIG. 2 may be dispensed with and only the first end sensor 25 be used to determine the angle corresponding to approximately one turn. However, when two end sensors are used in the above embodiment, the change in length between the two sensors 25 and 26 can be disregarded and a more accurate measurement can be realized. It should be understood that in building the second and subsequent layers of strip member A, the thickness of strip member A already taken up is added to the diameter D of the building drum.

What is claimed is:

1. A method of winding a strip member on a drum of a tire building machine, comprising:

providing a first strip end sensor directed at a first detection position on said drum; whereat said strip member is brought into initial contact with said drum;

providing a second strip end sensor directed at said drum and angularly displaced from said first strip end sensor;

providing an angle detector to detect an angle of rotation of said drum;

rotating said drum in a drum rotational direction while delivering a front end of said strip member to said drum to begin wrapping said strip member on said drum;

detecting said front end of said strip member using said first strip end sensor and initiating a first angular measurement using said angle detector;

detecting arrival of said front end of said strip member at said second strip end sensor;

completing said first angular measurement using said angle detector and initiating a second angular measurement when said front end of said strip member is detected by said second strip end sensor and continuing to rotate said drum in said drum rotational direction;

calculating a first angle representing angular displacement from said second strip end sensor to said first strip end senor in the drum rotational direction based on output from said angle detector;

detecting arrival of a trailing end of said strip member at said first strip end sensor brought about by rotating said drum in said drum rotational direction;

completing said second angular measurement using said angle detector when said trailing end of said strip member is detected by said first strip end sensor to yield a second angle; and calculating an overlap length if said second angle is greater than said first angle and calculating a gap length if said second angle is less than said first angle.

2. The method of claim 1 wherein:

said overlap length is calculated using the formula $$X=(D+2t)\pi \times ((\theta_1-\theta_0)/360)$$

when said second angle is greater than said first angle, where:

X=said gap length;
D=a diameter of said drum;
t=a thickness of said strip member;
$\theta_0$=said first angle; and
$\theta_1$=said second angle; and
said gap length is calculated using the formula $$Y=(D+2t)\pi \times ((\theta_0-\theta_2)/360)$$

when said first angle is greater than said second angle and where $\theta_2$ equals said second angle.

* * * * *